United States Patent
Mine et al.

(10) Patent No.: US 7,153,041 B2
(45) Date of Patent: Dec. 26, 2006

(54) OPTICAL CONNECTOR WITH SHUTTER

(75) Inventors: Keiji Mine, Yao (JP); Hiroshi Nakagawa, Kyoto (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 11/068,775

(22) Filed: Mar. 2, 2005

(65) Prior Publication Data
US 2005/0202701 A1 Sep. 15, 2005

(30) Foreign Application Priority Data
Mar. 12, 2004 (JP) .............................. 2004-071595

(51) Int. Cl.
*G02B 6/36* (2006.01)
(52) U.S. Cl. .................... 385/92; 385/139; 439/142
(58) Field of Classification Search ............ 385/88–94, 385/139, 147; 439/135–138, 142, 147
See application file for complete search history.

(56) References Cited

U.S. PATENT DOCUMENTS

| | | | |
|---|---|---|---|
| 6,004,043 A | 12/1999 | Abendschein et al. | 385/76 |
| 6,296,398 B1 | 10/2001 | Lu | 385/60 |
| 6,411,581 B1 * | 6/2002 | Saitou et al. | 720/652 |
| 6,866,424 B1 * | 3/2005 | Tanaka et al. | 385/55 |
| 2001/0017966 A1 | 8/2001 | Takaoka et al. | 385/92 |
| 2001/0048790 A1 | 12/2001 | Burkholder et al. | 385/78 |

FOREIGN PATENT DOCUMENTS

| | | |
|---|---|---|
| EP | 0 610 676 A2 | 8/1994 |
| EP | 0 610 676 A3 | 8/1994 |

OTHER PUBLICATIONS

Copy of European Search Report dated Jun. 6, 2005, 3 pages.
Patent Abstracts of Japan, vol. 006, No. 245; JP 57 142607, Sep. 3, 1982, (Yamatake Honeywell KK), 1 pg.

* cited by examiner

*Primary Examiner*—Kevin S. Wood
(74) *Attorney, Agent, or Firm*—Armstrong, Kratz, Quintos, Hanson & Brooks, LLP (57) ABSTRACT

An optical connector with a shutter which minimizes the accommodating space for the shutter of inward opening type. The shutter opening inward in accordance with the insertion of the plug is provided near the inlet of the plug inserting hole of the case. A shutter biasing spring holding the shutter in the closed position is a torsion coil spring including a pair of arms projecting in two directions from the coil part. The shutter biasing spring is arranged so that the coil part faces towards the hole back side between the back surface of the shutter and the inner wall surface of the case. When the shutter opens and lies along the inner wall surface, both arms are sandwiched between the shutter and the inner wall surface of the case, and the coil part is positioned outside between the shutter and the inner wall surface of the case.

3 Claims, 13 Drawing Sheets

OPTICAL CONNECTOR WITH SHUTTER

BACKGROUND OF THE INVENTION

1. Field of the Invention

The present invention relates to optical connectors used in optical data transmission and, more specifically, to an optical connector with a shutter in which an inserting port to which a plug of a fiber-optic cable is inserted is opened and closed with the shutter.

2. Description of the Related Art

The optical connecter used in optical data transmission has a basic structure of a combination of a case including an inserting hole to which the plug of the fiber-optic cable is inserted and an optical element arranged at the back part of the inserting hole so as to be optically coupled with the plug inserted into the inserting hole of the case, on both a transmission side and a reception side.

In such an optical connector, closing of an opening, that is, the inserting port of the inserting hole, is carried out with an openable and closable shutter to prevent foreign materials such as dust from entering the inserting hole when the plug of the fiber-optic cable is not inserted.

The shutter generally has a single-swinging hinge structure that pivots with one side rim as the center and, more specifically, includes two types of an outward opening type that opens outward of the case and an inward opening type that open inward of the case. In the case of the outward opening type, an operation of opening the shutter is required when plugging in the plug whereas in the case of the inward opening type, the shutter is automatically opened with the plug-in operation of the plug, and thus the overall evaluation including operationality is higher in the latter inward opening type.

In the case of the optical connecter with the inward opening shutter, a shutter biasing spring is used to elastically hold the shutter in the closed state. For the shutter biasing spring, one type of a torsion coil spring in which a pair of arms projects in two directions from the coil part is mainly used. This is because the hinge shaft of the shutter may be passed through the coil part of the spring or the coil part may be used as the hinge shaft. The optical connecter with the inward opening shutter including the torsion coil spring is disclosed in, for example, U.S. Pat. No. 6,004,043.

In the optical connecter with the inward opening shutter disclosed in U.S. Pat. No. 6,004,043, a single-swinging type inward opening shutter that pivots with the lower rim as the center is used. For the torsion coil spring, the spring including a pair of coil parts on both sides, a U-shaped inner arm projecting from the inner sides of each of the pair of coil parts on both sides and having each distal end coupled to each other, and a pair of outer arms projecting from the outer sides of each of the pair of coil parts on both sides is used.

The coil parts on both sides are externally fitted to the hinge shaft integrally arranged at the back side of the shutter, and the inner arm as well as the outer arms on both sides are widened so that the open angle is greater than or equal to 90° in a state not subjected to external force, and are narrowed so that the open angle is substantially 90° in a state arranged between the back side of the shutter and the inner surface of the lower side of the case, thereby elastically holding the shutter in the closed position.

In such an optical connecter with shutter, with the operation of plugging in the plug of the fiber-optic cable to the plug inserting hole of the case, the shutter moves towards the inside of the case against the biasing force of the biasing spring, and eventually, the shutter moves to a state parallel to the inner surface of the case on the lower side, and the inserting hole completely opens. Here, the inner arm and the outer arms on both sides move towards a direction in which the open angle narrows until they are in a substantially parallel state, and are sandwiched between the shutter and the inner surface of the case on the lower side along with the coil parts on both sides. That is, when the shutter is moved to the opened position, the coil parts on both sides are in a state sandwiched between the shutter and the inner surface of the case on the lower side with the hinge shaft.

Figure 10:
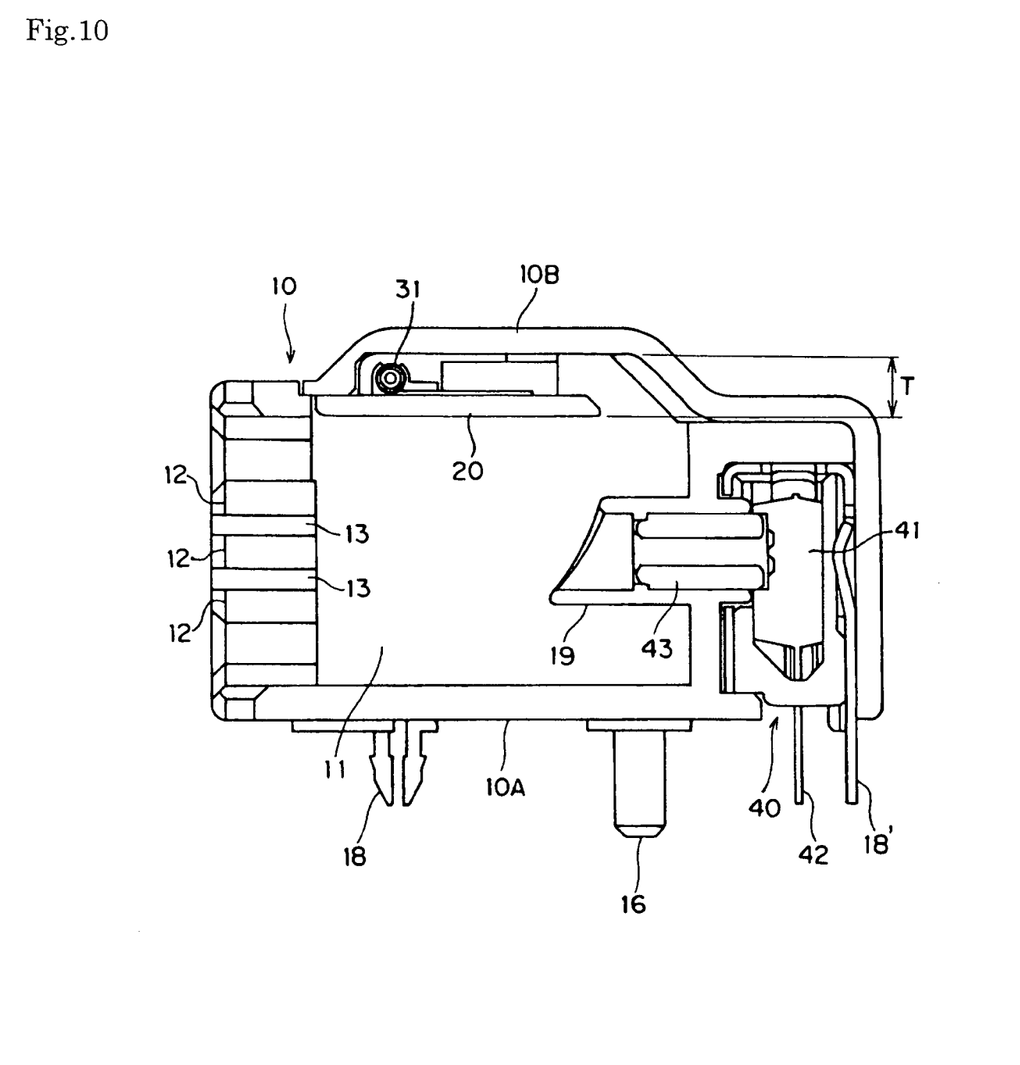
FIG. 10 a longitudinal side view of a comparative optical connector in which an inward opening shutter of conventional structure is attached to the optical connector.

Consequently, for the space thickness T for accommodating the shutter in the opened position, the size in which the outer diameter of the coil part is added to the shutter thickness is minimum required (see FIG. 10). The outer diameter of the coil part depends on the thickness of the hinge shaft of the shutter, and a size of a certain extent is required because the hinge shaft cannot be made extremely thin in terms of strength. Thus, the accommodating space of the shutter increases, and further, the entire connecter becomes large.

SUMMARY OF THE INVENTION

The present invention is proposed in view of the above, and aims to propose an optical connecter with a shutter having a structure that opens the shutter inward while making the accommodating space of the shutter as small as possible.

To achieve the above aim, an optical connector with a shutter according to the present invention includes a case including an inserting hole to which a plug of a fiber-optic cable is inserted, an optical element arranged at the back part of the inserting hole so as to be optically coupled with the plug inserted into the inserting hole of the case, an inward opening type shutter hinge-supported in the vicinity of an opening of the inserting hole and opening inward with the insertion of the plug into the inserting hole, and a shutter biasing spring arranged between a back surface of the shutter and the inner wall surface of the case so as to elastically support the shutter in the closed state and having one part or an entire part thereof sandwiched between the shutter and the inner wall surface of the case so as to be substantially coplanar when the shutter opens and lies along the inner wall surface of the case.

The following torsion coiled spring or plate spring, for example, is used as the shutter biasing spring.

A torsion coil spring, including a pair of arms projecting in two directions from the coil parts, is arranged with the coil parts facing towards the back part side of the hole between the back surface of the shutter and the inner wall surface of the case, and is arranged so that both arms are sandwiched between the shutter and the inner wall surface of the case and the coil parts are positioned on the outside between the shutter and the inner wall surface of the case when the shutter opens and lies along the inner wall surface of the case.

The plate spring is cut out from a flat plate made of metal, and has a configuration of elastically deforming to a sheet of plate shape between the shutter and the inner wall surface of the case when the shutter opens and lies along the inner wall surface of the case.

When the torsion coil spring is used, the shutter biasing spring, opposed to that of the conventional art, is arranged with the coil parts facing towards the back part side between the back surface of the shutter and the inner wall surface of the case, and is arranged so that both arms are sandwiched between the shutter and the inner wall surface of the case and the coil parts are positioned on the outside between them when the shutter opens and lies along the inner wall surface of the case. Thus, for the minimum necessary space thickness to accommodate the shutter in the opened position, the outer diameter of the coil parts does not need to be added to the shutter thickness, and only the diameter of the wire of the arm needs to be added, thereby enabling reduction in the accommodating space thickness.

When the plate spring is used, the plate spring elastically deforms into a sheet of plate shape between the shutter and the inner wall surface of the case when the shutter opens and lies along the inner wall surface of the case. Thus, for the minimum necessary space thickness to accommodate the shutter in the opened position, only the plate thickness of the plate spring needs to be added to the shutter thickness, thereby enabling reduction in the accommodating space thickness.

The case includes a key groove for recognizing the type of plug in the vicinity of the opening of the inserting hole, and preferably has a configuration in which the ribs defining the key groove also serve as a stopper for holding the shutter in the closed state. In such a configuration, an independent stopper is unnecessary, and the structure is simplified. Further, the key groove for recognizing the type of plug is also closed by the shutter.

The case is also preferably configured including a body with the wall surface of the side the shutter opens opened, and a cover attached to the body so as to block the opening. According to such a configuration, the shutter is accommodated within the opening of the body, and by having the cover as a thin metal cover, the wall thickness of the side the shutter opens is made thin, thereby reducing the total thickness of the connector. Further, by using the opening during body molding by metal mold, the convex part can be easily formed to lock the plug in the wall surface opposite the opening of the body.

The optical connector with a shutter according to the present invention has a configuration in which the shutter biasing spring for elastically holding the inward opening type shutter in a closed position is arranged between the back surface of the shutter and the inner wall surface of the case and one part of or entire part thereof is sandwiched so as to be substantially coplanar between the shutter and the inner wall surface of the case when the shutter opens and lies along the inner wall surface of the case, and thus even if the inward opening type shutter is used, the minimum necessary space thickness for accommodating the shutter in the opened position is made thin to nearly the shutter thickness, and the entire connector is effectively made small.

BRIEF DESCRIPTION OF THE DRAWINGS

FIGS. 6(a) and (b) are longitudinal side views showing the opening condition of the shutter of the optical connecter with shutter in steps;

DETAILED DESCRIPTION OF THE EXEMPLARY EMBODIMENTS

Figure 1:
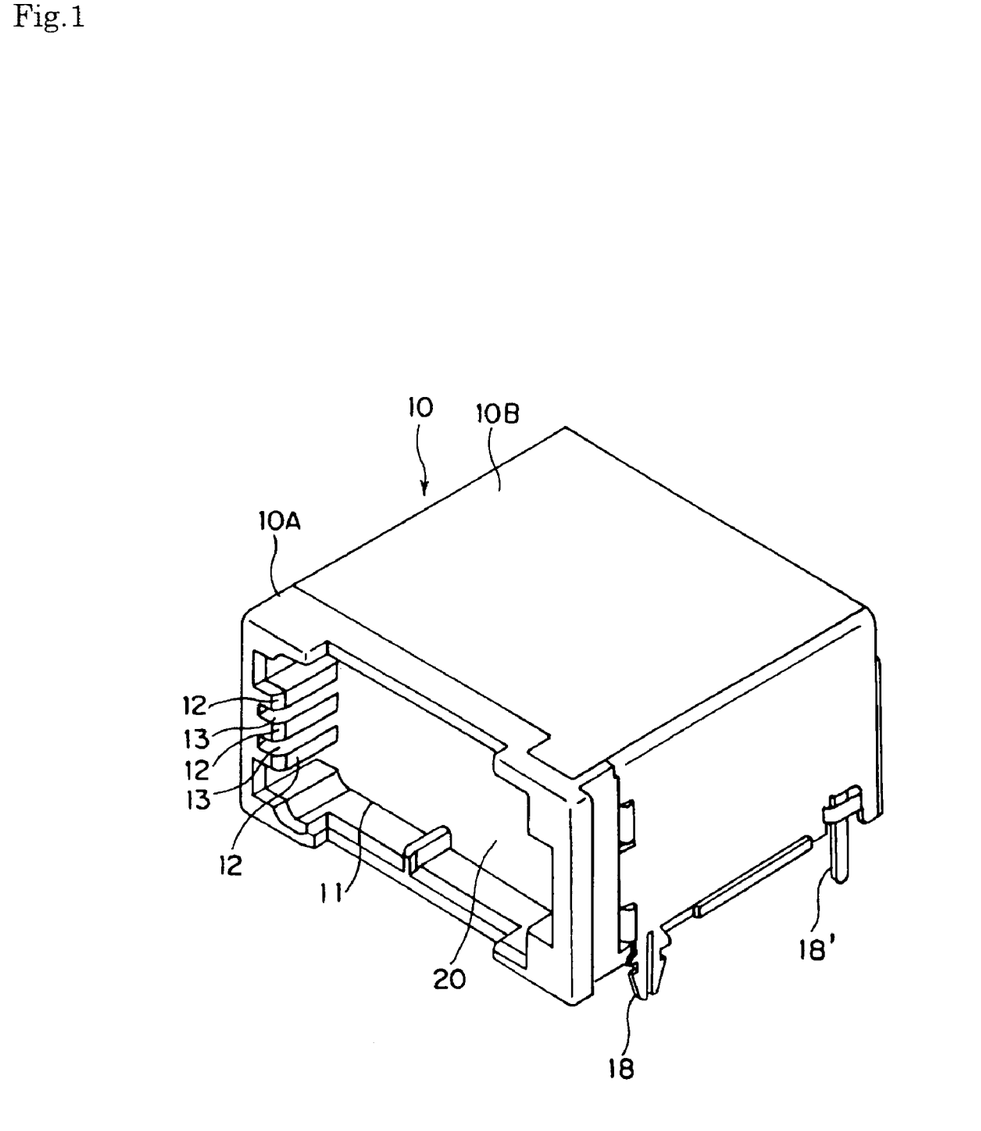
FIG. 1 is a perspective view showing an optical connecter with shutter according to one embodiment of the present invention.
Figure 2:
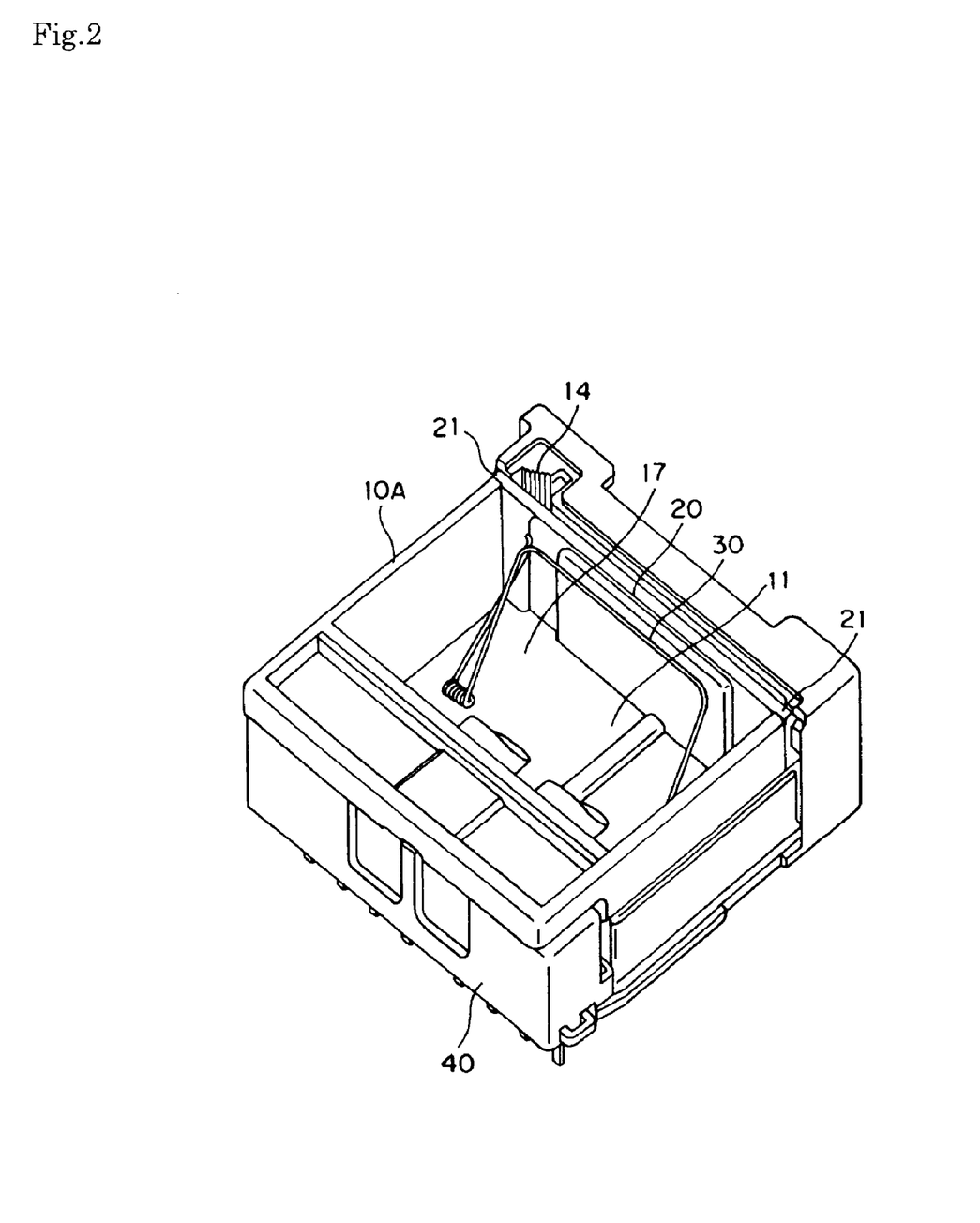
FIG. 2 is a perspective view showing the optical connecter with shutter with a cover removed.
Figure 3:
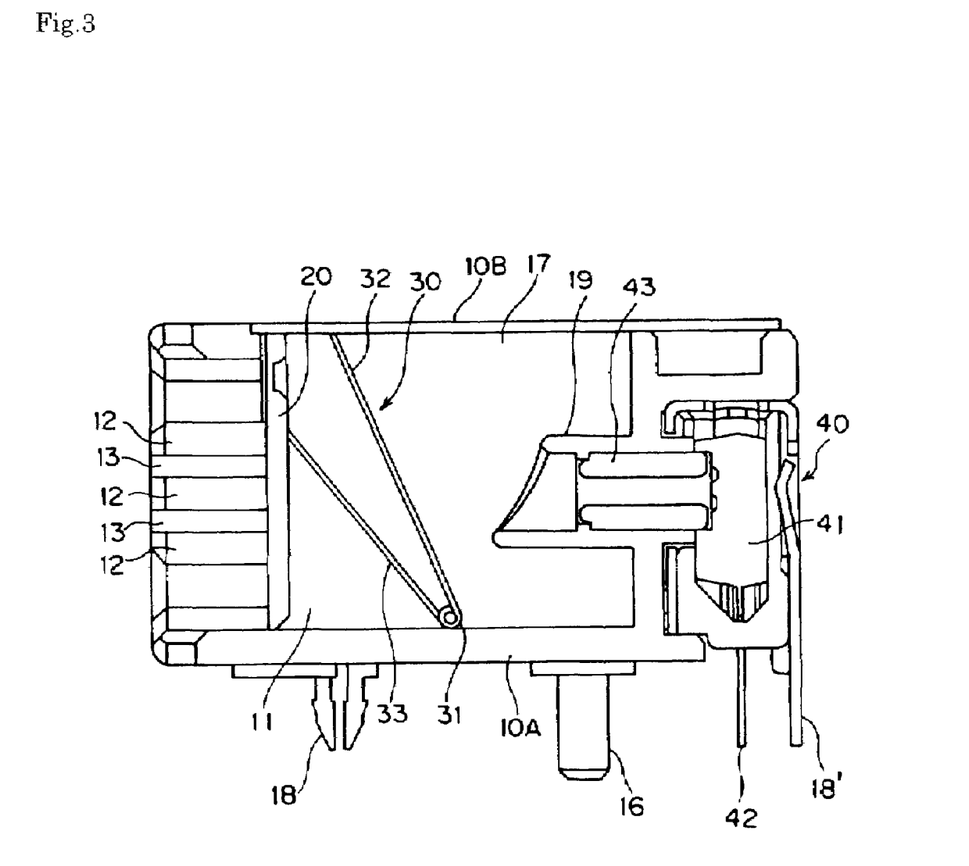
FIG. 3 is a longitudinal side view of the optical connector with a shutter.
Figure 4:
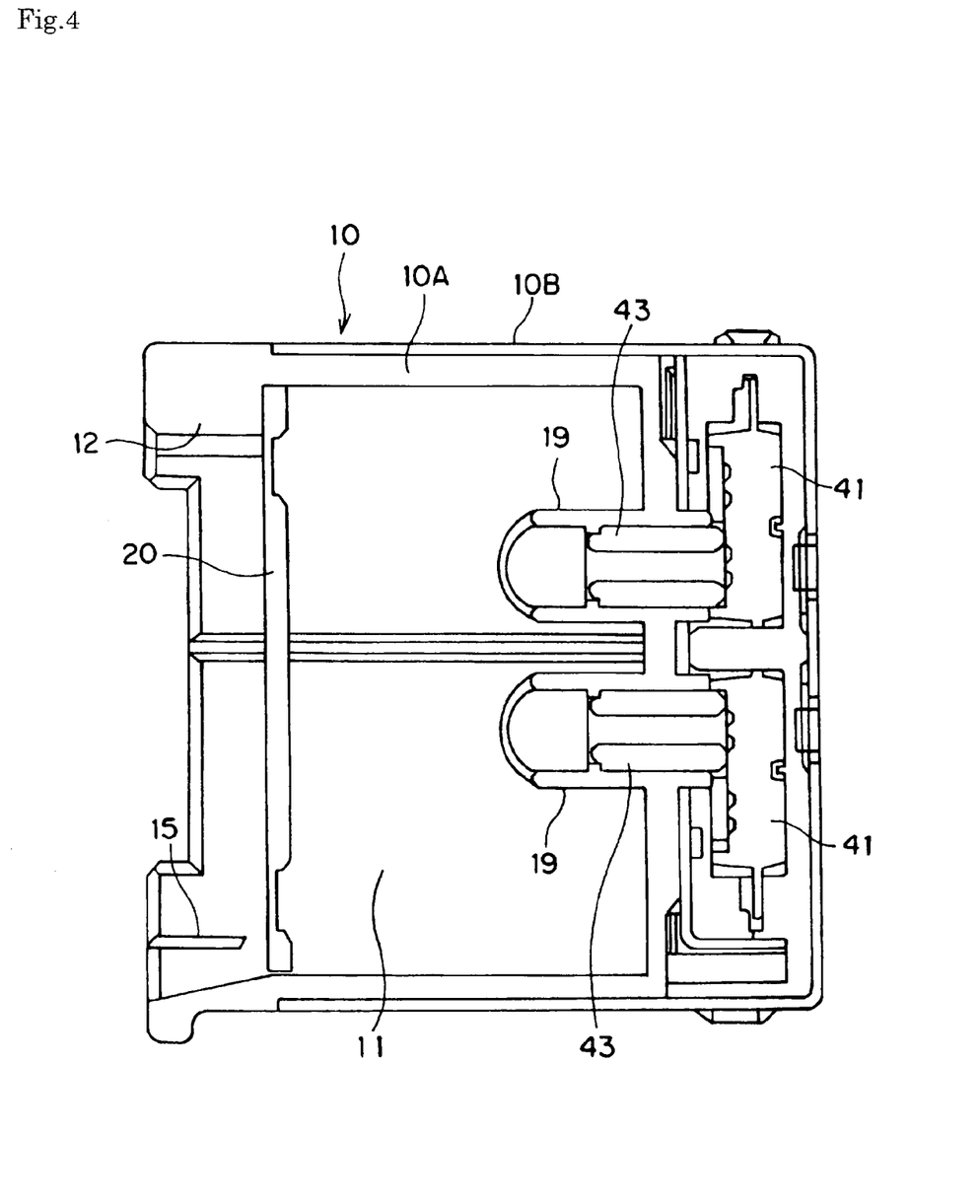
FIG. 4 is a cross-sectional plan view of the optical connector with a shutter.
Figure 5:
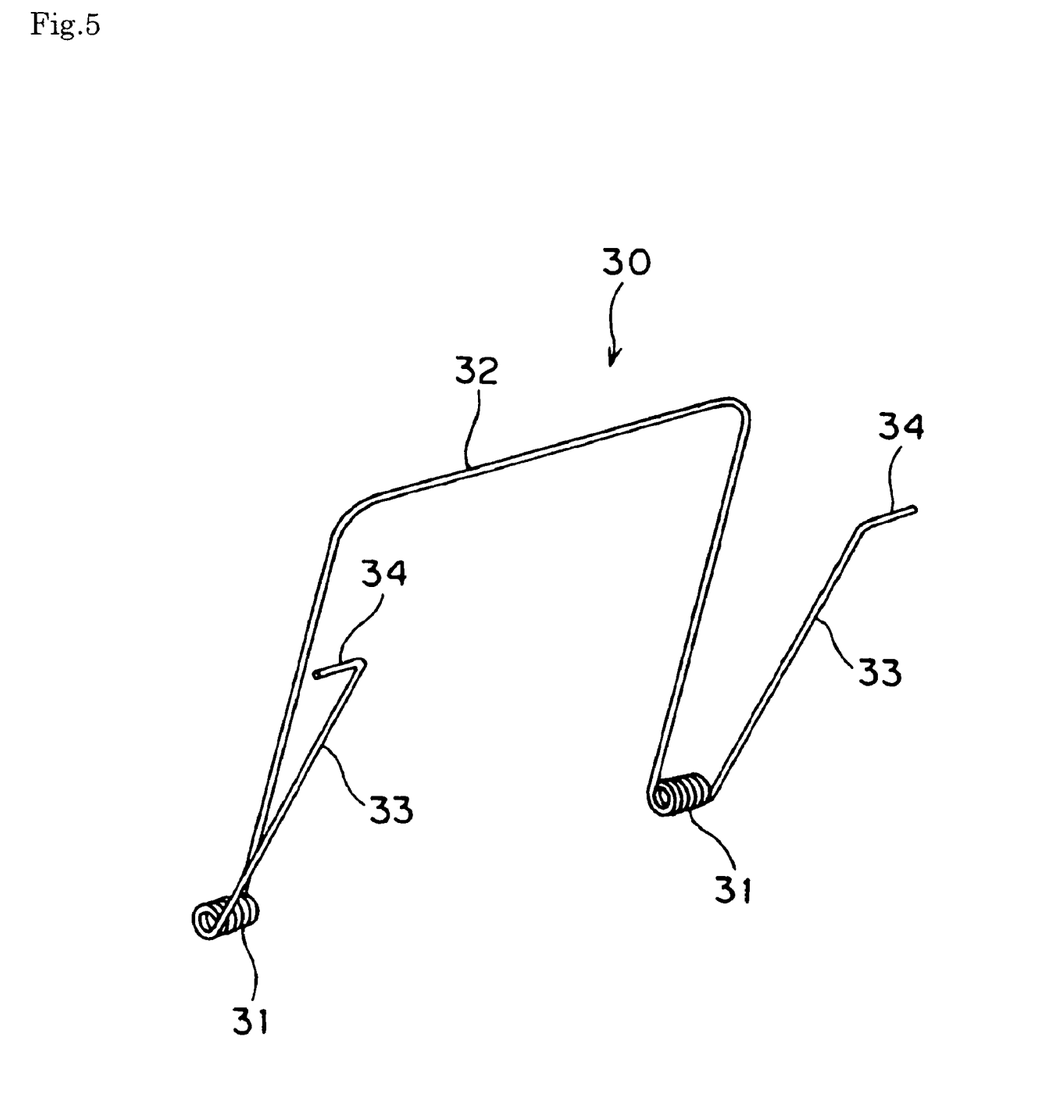
FIG. 5 is a perspective view of a shutter biasing spring used in the optical connector with a shutter.
Figure 6:
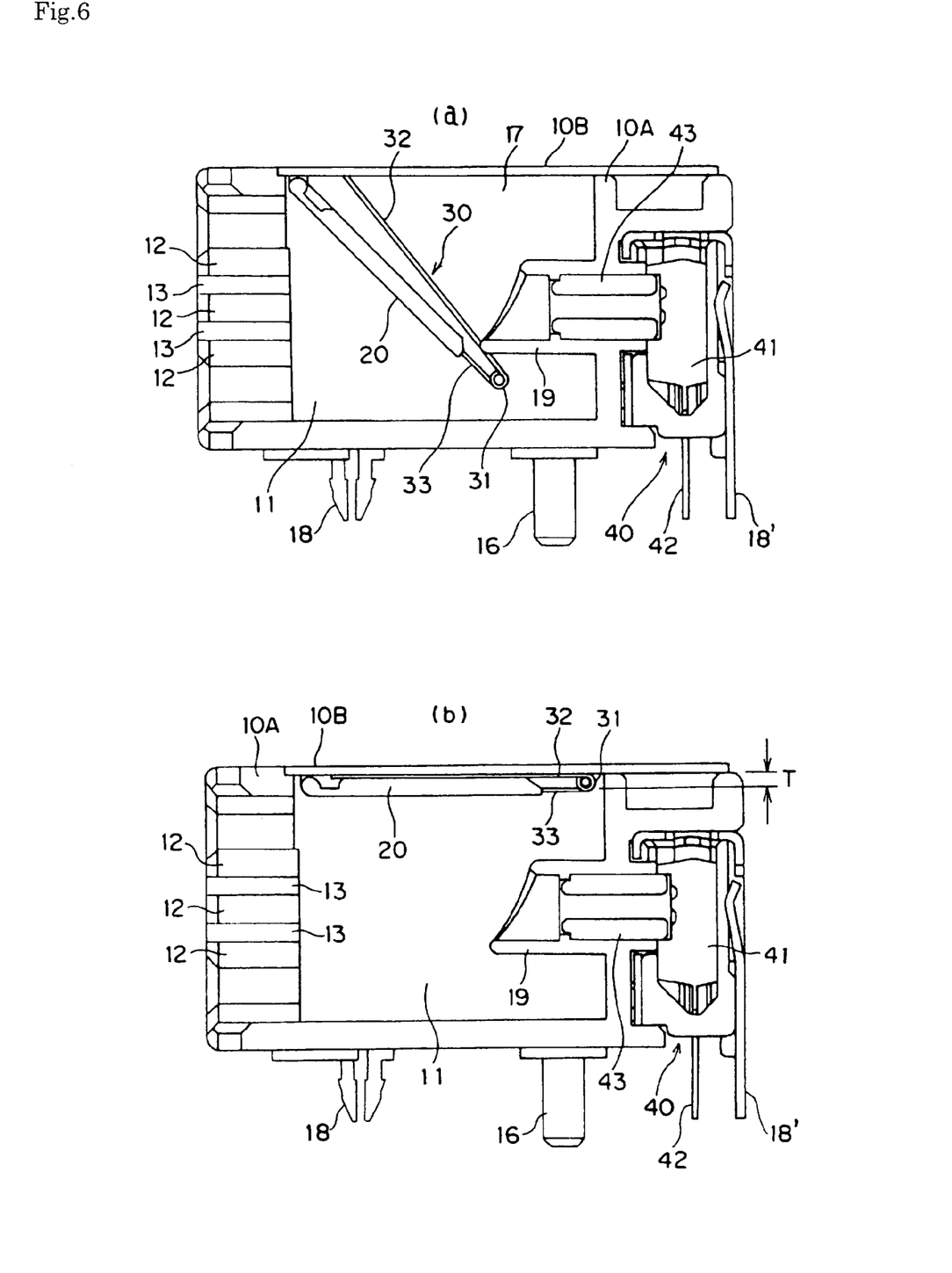

The embodiments of the present invention will now be explained based on the figures. FIG. 1 is a perspective view showing an optical connecter with shutter according to one embodiment of the present invention, FIG. 2 is a perspective view showing the optical connecter with shutter with the cover removed, FIG. 3 is a longitudinal side view of the optical connector with a shutter, FIG. 4 is a cross-sectional plan view of the optical connector with a shutter, FIG. 5 is a perspective view of a shutter biasing spring used in the optical connector with a shutter, and FIG. 6 is a longitudinal side view showing the opening state of the shutter of the optical connecter with shutter in steps.

Figure 7:
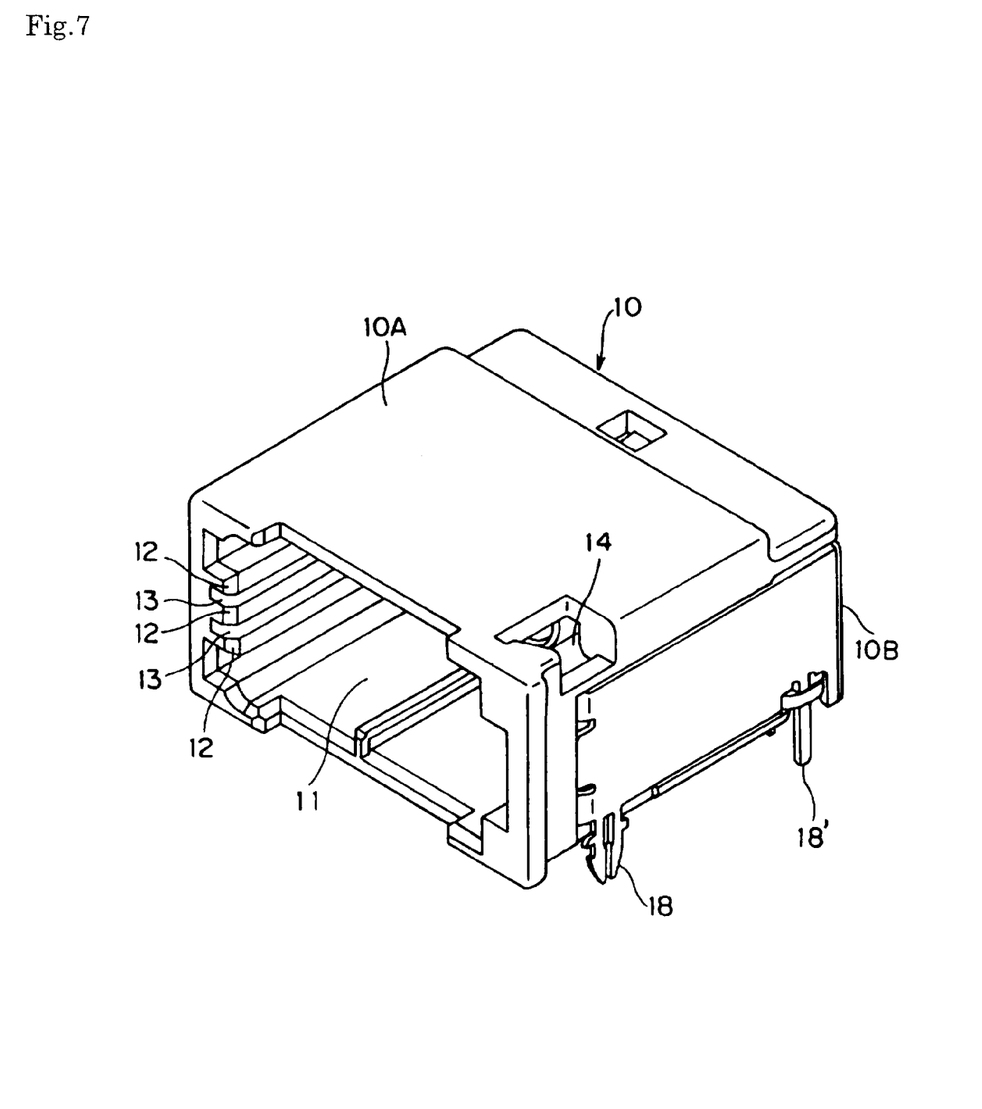
FIG. 7 is a perspective view of a conventional optical connector of the same form without a shutter.
Figure 8:
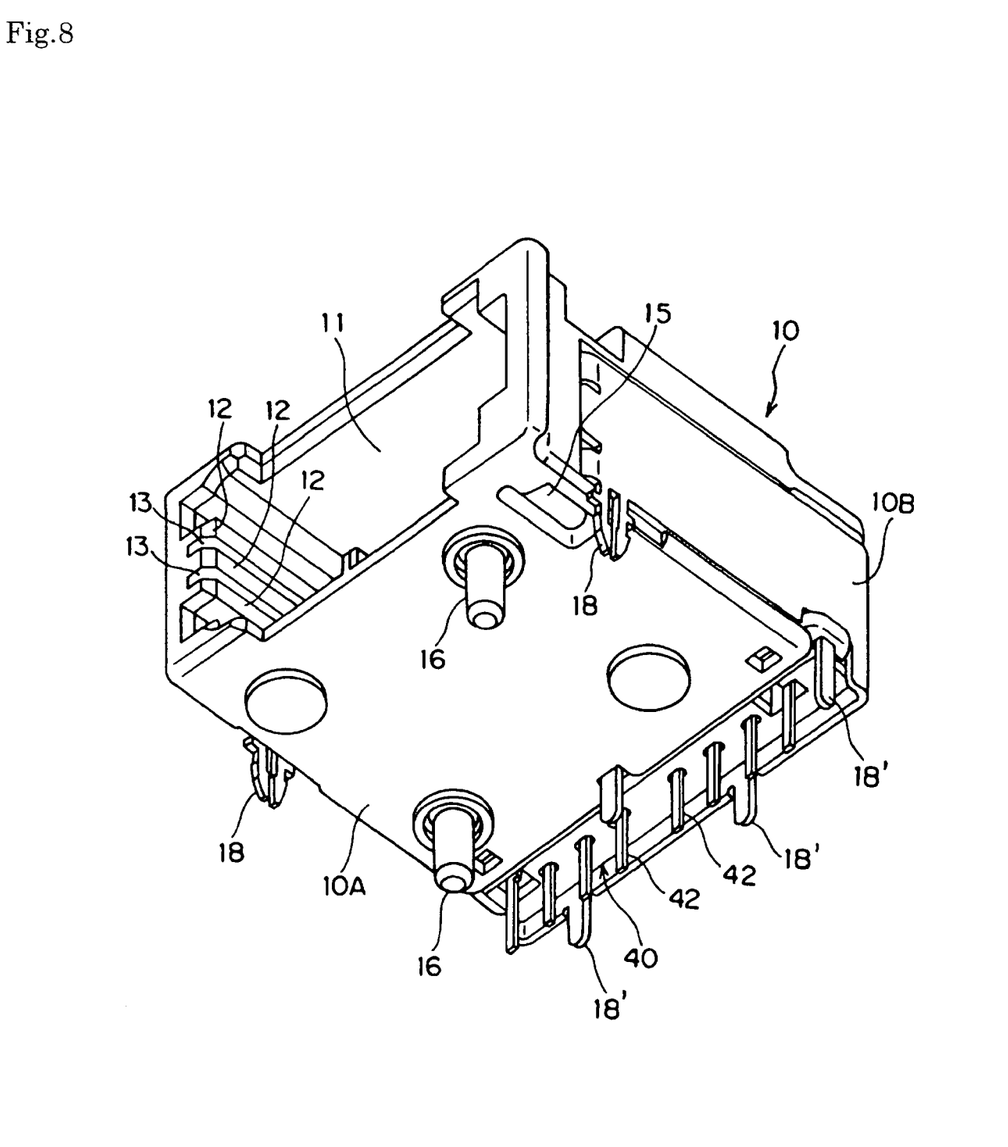
FIG. 8 is another perspective view of the optical connector.
Figure 9:
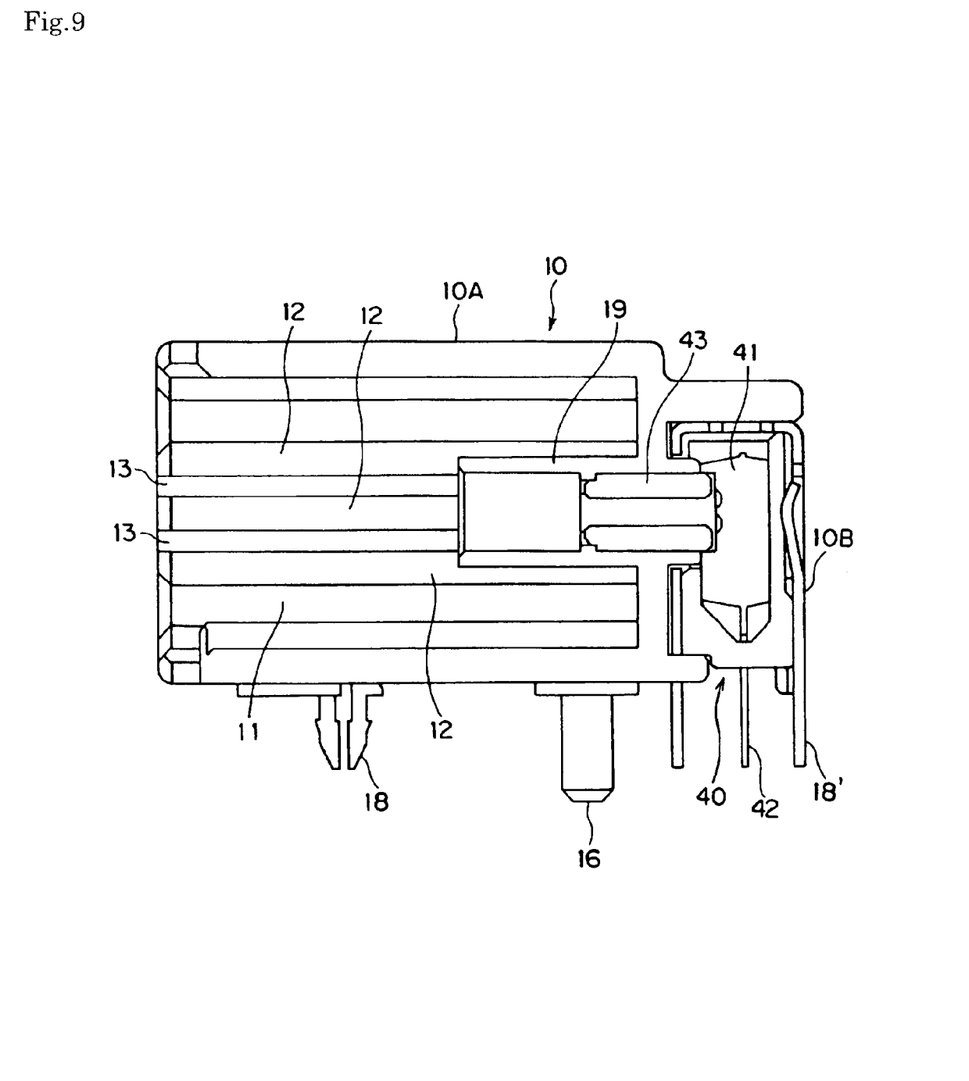
FIG. 9 is a longitudinal side view of the optical connector.

The optical connector with a shutter according to the present embodiment is one type of LAN for automobiles, and is such in which the inward opening type shutter is attached to the optical connector complying with the MOST standard supporting the high-speed optical data link of in-vehicle multimedia equipments such as a car navigation system, in-vehicle audio, and various changers. For reference, the same type of optical connector of the conventional art not equipped with shutter is shown in FIG. 7 to FIG. 9, and the comparative optical connector attached with an inward opening shutter of the conventional structure disclosed in patent article 1 is shown in FIG. 10.

The MOST (Media Oriented System Transport) is a registered trademark of OASIS in Japan.

As shown in FIG. 1 to FIG. 4, the optical connector with a shutter according to the present embodiment is formed into a square box shape, and includes a case 10 with a plug inserting hole opened at the front surface, a shutter 20 attached to the case 10 for opening and closing the opening of the plug inserting hole, a shutter biasing spring 30 arranged in the case 10 to elastically hold the shutter 20 in the closed position, and an optical element unit 40 attached to the back surface side of the case 10.

The case 10 consists of a square box shaped body 10A made of resin, and a cover 10B for covering the body 10A along with the optical element unit 40. The interior of body 10A includes a square plug inserting hole 11 opened on the front surface side, and in addition to the front surface, the upper surface is also opened across the entire width over a range excluding the edges on the front surface side and the edges on the back surface side.

A horizontal rib 12 inwardly projecting from one side wall is provided in a plurality of steps in the vicinity of the plug inserting port of the body 10A. The rib 12 of a plurality of stages is used to define a horizontal key groove 13 for identifying the type of the plug inserted into the relative optical connecter between the adjacent ribs, and by being exclusively arranged in the vicinity of the plug inserting port of the body 10A, also serves as a stopper for fixing the shutter 20 in the closed position.

A pair of upper and lower locks 14, 15 for securing the plug inserted into the plug inserting hole 11 is arranged in the vicinity of the plug inserting port on the opposite side of the rib 12. The upper side lock 14 is concave, and the lower lock 15 is convex. A positioning boss 16 projecting downward is integrally provided at the bottom surface of the body 10A. The boss 16 fixes the relative optical connecter in place by being inserted through a pass-through hole of the substrate with the relative optical connecter mounted to the substrate.

The cover 10B is made of a metal thin plate formed into an inverted U-shape, and by being placed on the parts excluding the edges of the front surface side of the body 10A from above, blocks the upper surface opening 17 of the body 10A. Further, it includes fixed parts 18 and 18' that cover the side walls on both sides of the body 10A and project downward from the body 10A. The fixed part 18 is a fixing nail for fixing the relevant optical connecter to the substrate. The fixed part 18' is a pin for positioning and fixing the relevant optical connector to the substrate.

The shutter 20 is a square resin plate that entirely covers the inlet part of the plug inserting hole 11. The resin plate is arranged on the back side of the rib 12 provided at the inlet part, and forms a shutter 20 of single-swinging and inward opening type that opens inward with the upper rim as the center. That is, the shutter 20 includes a pair of hinge shafts 21, 21 projecting towards both sides from the upper rim, and by engaging the hinge shafts 21, 21 to the upper surface of the side wall on both sides of the body 10A, is supported so as to be openable towards the inside of the plug inserting hole 11 with the upper rim as the center.

The shutter biasing spring 30 is arranged on the back side of the shutter in the plug inserting hole 11. The biasing spring 30, as shown in FIG. 5, is a torsion coil spring including coil parts 31, 31 on both sides, a U-shaped inner arm 32 projecting from the inner parts of the coil parts 31, 31 and coupled at a horizontal part, and a pair of outer arms 33, 33 projecting from the outer parts of the coil parts 31, 31. The outer arms 33, 33 project in a direction different from the inner arm 32 and hold the open angle of about 30° in a state not applied with external force. Each distal end of the outer arms 33, 33 is outwardly bent at right angles to form coupling parts 34, 34 with the shutter 20.

The shutter biasing spring 30 is arranged with the coil parts 31, 31 on both sides facing towards the hole back part side of the plug inserting hole 11 and, more specifically, is arranged with the coupling parts 34, 34 plugged into the back side of the shutter 20 and in this state, the inner arm 32 is pressed by the top plate of the cover 10B, and the coil parts 31, 31 are pushed against the bottom plate of the body 10A. The shutter biasing spring 30 elastically deforms in a direction in which the open angle becomes small, thereby pushing the shutter 20 against the rib 12 on the front surface side by the reactive force to elastically hold the shutter 20 in an upright closed position.

The outer arms 33, 33 on both sides are designed so that the length from the coupling parts 34, 34 to the coil parts 31, 31 is greater than the length from the attachment position of the coupling parts 34, 34 at the shutter 20 to the lower rim of the shutter. Further, the inner arm 32 is designed to be longer than the coupling parts 34, 34 for the necessity of contacting the distal end thereof to the top plate of the cover 10B.

The optical element unit 40 is fixed to the back surface side of the body 10A using the cover 10B. The unit 40 has a pair of optical elements 41, 41 built-in on both sides, and a plurality of leads 42 extending therefrom is projected downward. The optical elements 41, 41 are optically connected to the plug inserted into the plug inserting hole 1 by way of the sleeves 43, 43 passing through the back plate of the body 10A. The sleeves 43, 43 are supported within cylindrical supporting parts 19, 19 integrally formed at the back plate of the body 10A, and the distal ends of the supporting plates 19, 19 are cut diagonally so as to avoid interference with the shutter 20 being opened.

The function of the optical connector with shutter according to the present embodiment will now be explained in detail.

When the relevant optical connector is not used, that is, when the plug of the fiber-optic cable is not inserted into the plug inserting hole 11 of the case 10, the inlet that is, the plug inserting port of the plug inserting hole 11 is closed by the shutter 20. The shutter 20 is elastically pressed against the front surface side by the shutter biasing spring 30 on the back surface side. Thus, the event of the shutter 20 carelessly being opened is avoided.

When inserting the plug of the fiber-optic cable to the plug inserting hole 11 of the case 10, the plug is pushed into the plug inserting hole 11 from the front surface side with the shutter 20 closed. Thus, as shown in FIG. 6(*a*) and FIG. 6(*b*), the shutter 20 is opened inwardly against the biasing force of the shutter biasing spring 30. The operation of opening the shutter 20 during use is thereby unnecessary.

When the shutter 20 is being opened, the shutter biasing spring 30 on the back surface side has the outer arms 33, 33 on both sides inclined inwardly along with the shutter 20. The shutter biasing spring 30 thereby elastically deforms in a direction in which the open angle becomes small. The inner arm 32 slidably contacts the top plate of the cover 10B. Eventually, the shutter 20 is opened until it is parallel to the top plate of the cover 10B.

In a completely opened state, the shutter 20 is accommodated in the upper surface opening 17 of the body 10A. The inner arm 32 and the outer arms 33, 33 of the shutter biasing spring 30 are sandwiched so as to be substantially coplanar between the shutter 20 and the top plate of the cover 10B without interfering with each other.

On the other hand, when the shutter 20 is being opened, the coil parts 31, 31 of the shutter biasing spring 30 do not interfere with the supporting parts 19, 19 as they pass both sides of the cylindrical supporting parts 19, 19. In a state where the shutter 20 is completely opened, the coil parts 31, 31 on both sides are positioned on the outside (back surface side) between the shutter 20 and the top plate of the cover 10B, and are not sandwiched in between. This is because the outer arms 33, 33 on both sides are designed so that the length from the coupling parts 34, 34 to the coil parts 31, 31 is longer than the length from the attachment position of the coupling parts 34, 34 at the shutter 20 to the lower rim of the shutter.

Thus, the minimum necessary space thickness T for accommodating the shutter 20 is that in which the diameter of the wire of the arm is added to the necessary thickness of the shutter 20, and is greatly reduced compared to the comparative optical connector with a shutter shown in FIG. 10.

In the comparative optical connector with a shutter shown in FIG. 10, the hinge shaft of the shutter 20 is passed through the coil parts 31, 31 of the plug biasing spring 30, and in a state in which the shutter 20 is opened, the coil parts 31, 31 are sandwiched between the top plate of the case 10 and the shutter 20. Thus, the minimum necessary space thickness T for accommodating the shutter 20 is such in which the outer diameter of the coil parts 31, 31 is added to the necessary thickness of the shutter 20, and is relatively large compared to the optical connector with a shutter according to the present embodiment.

In FIG. 10, the components and members corresponding functionally to the optical connector with a shutter according to the present embodiment are denoted with the same reference numbers.

When pulling the plug out from the plug inserting hole 11, the shutter 20 is again returned to the upright closed position due to the restoring force of the shutter biasing spring 30, and is pushed against the rib 12. As the plug inserting port is closed during non-use in this way, high dust-proofing property and stability are ensured.

Here, the rib 12 defines the key groove 13 for identifying the type of plugs. The rib 12 is provided across the entire length of the plug inserting hole 11 in the conventional connector without the shutter shown in FIG. 7 to FIG. 9. In the present embodiment, by leaving the rib 12 in the vicinity of the plug inserting port, that is, by removing it from regions other than the vicinity thereof, the inward opening of the shutter 20 becomes possible and the rib 12 is utilized as the stopper of such shutter 20 while maintaining the original function (plug type identifying function) of the rib 12.

In FIG. 7 to FIG. 9, the components and members corresponding functionally to the optical connector with a shutter according to the present embodiment are denoted with the same reference numbers.

The upper and lower pair of locks 14, 15 for fixing the plug inserted into the plug inserting hole 11, particularly, the lock 15 on the lower side is arranged in a projecting manner at the upper surface of the bottom plate of the body 10A. The body 10A has the upper surface greatly opened. Thus, the lock 15 can be easily formed without opening a hole at the bottom plate of the body 10A in terms of the metal mold structure.

In the conventional connector without the shutter shown in FIG. 7 to FIG. 9, the upper surface of the body 10A is not opened. Thus, the hole must be opened at the bottom plate to form the lock 15 at the bottom plate of the body 10A in terms of the metal mold structure.

The upper surface opening 17 of the body 10A also functions as the accommodating space of the shutter 20, as mentioned above.

Figure 11:
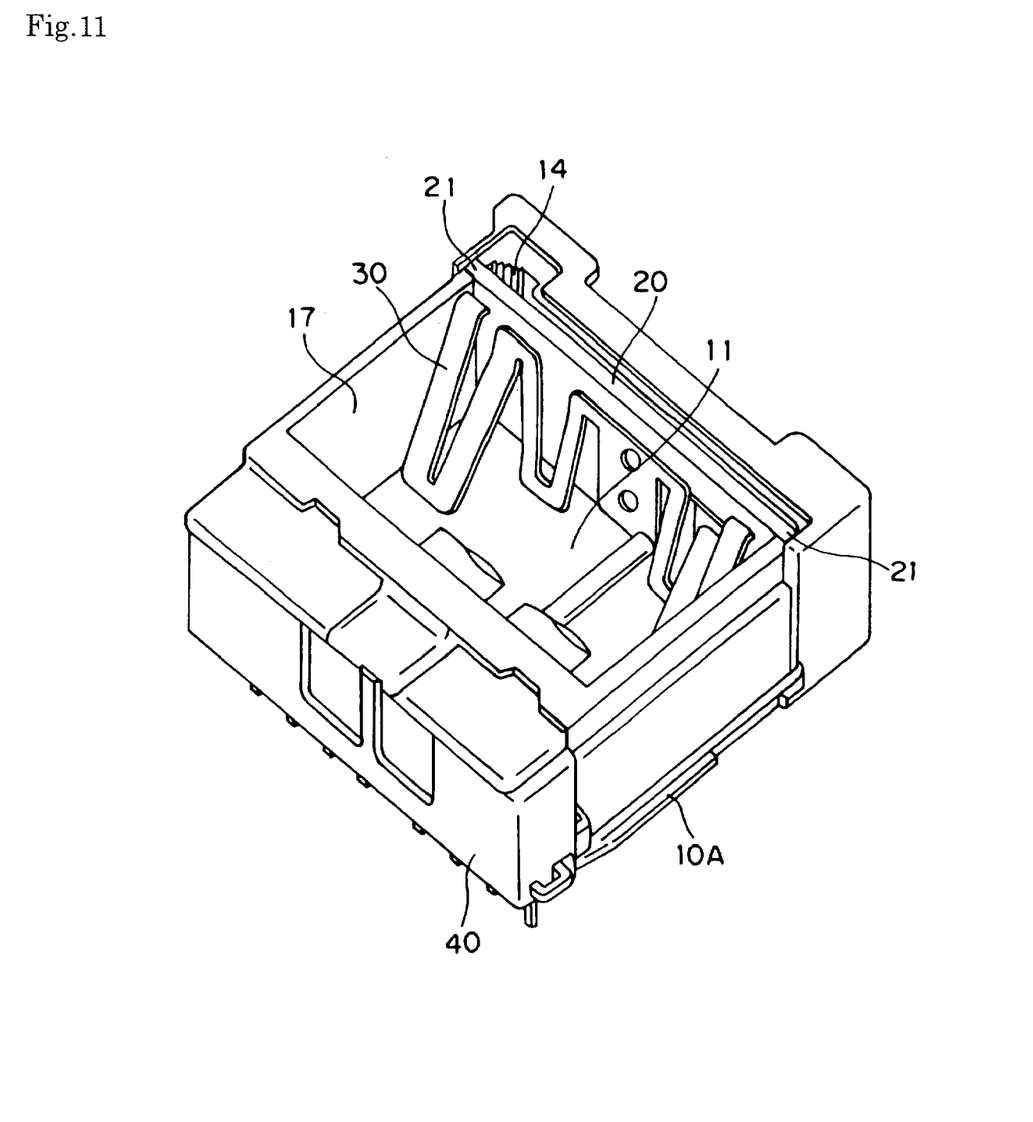
FIG. 11 is a perspective view of an optical connector with a shutter according to another embodiment of the present invention with the cover removed.
Figure 12:
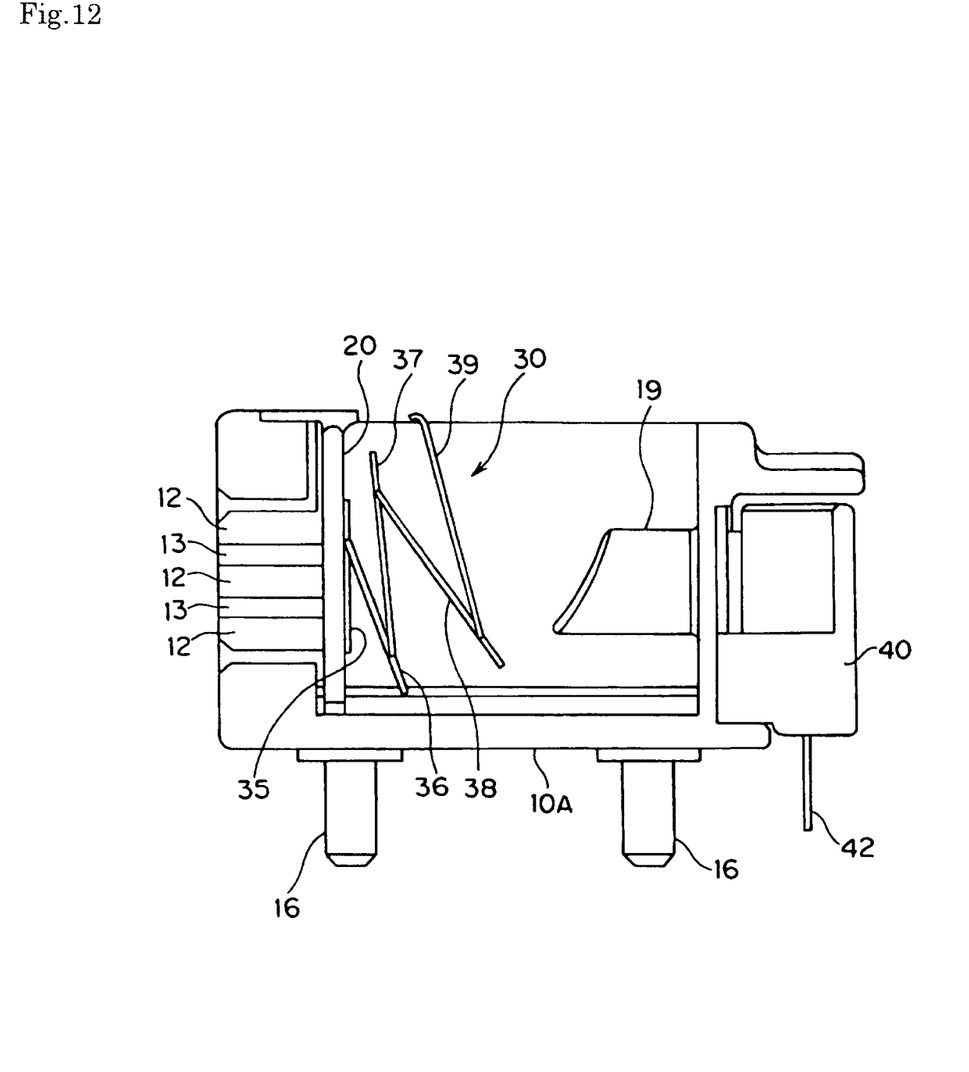
FIG. 12 is a longitudinal side view of the optical connector with a shutter with the cover removed.
Figure 13:
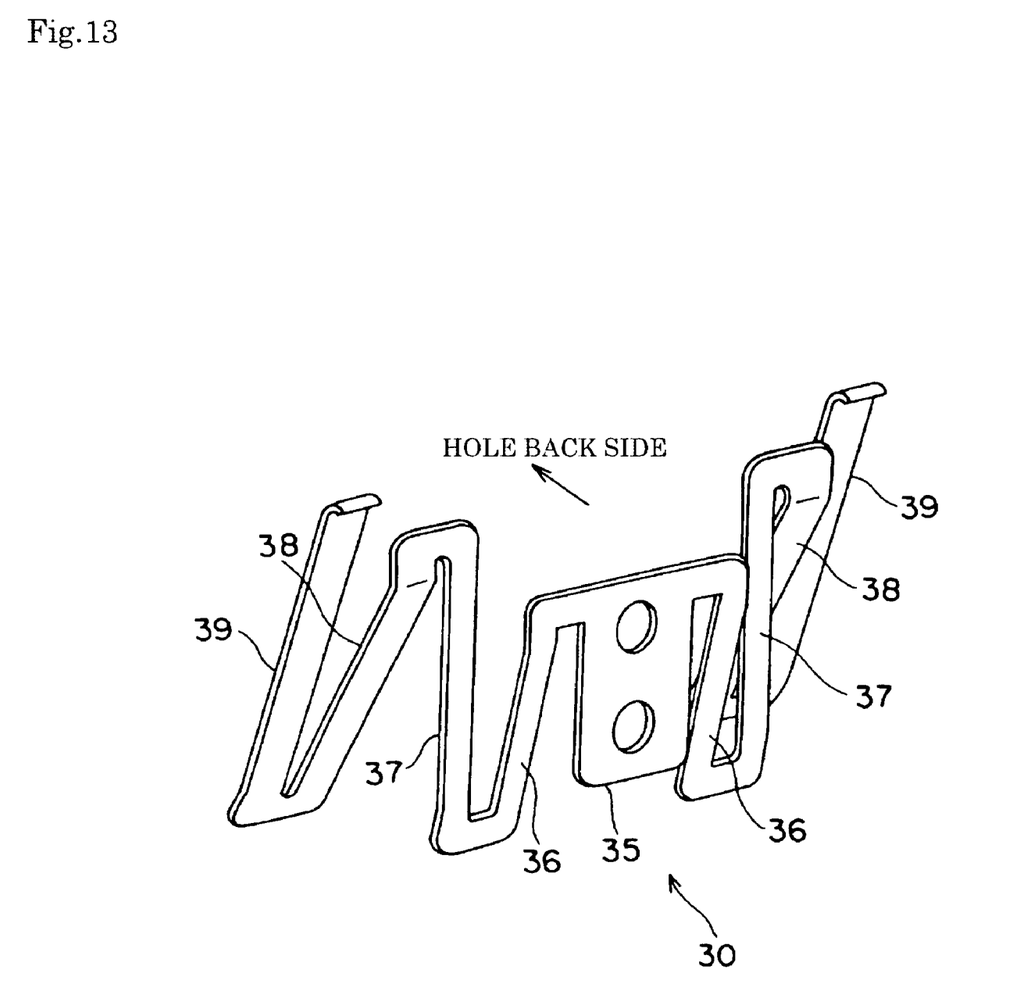
FIG. 13 is a perspective view of a shutter biasing spring used in the optical connector with a shutter.

FIG. 11 shows a perspective view of an optical connector with a shutter showing another embodiment of the present invention with the cover removed. FIG. 12 shows a longitudinal side view of the optical connector with a shutter with the cover removed. FIG. 13 shows a perspective view of a shutter biasing spring used in the optical connector with a shutter.

The optical connector with a shutter according to the present embodiment uses a different shutter biasing spring compared to the optical connector with a shutter shown in FIGS. 1 to 6. Other configurations are substantially the same as the optical connector with a shutter shown in FIGS. 1 to 6, and thus the same reference numbers are denoted for the same components and the detailed description thereof is omitted.

In the optical connector with a shutter according to the present embodiment, a plate spring cut out from a sheet of metal plate is used for the shutter biasing spring 30. The plate spring includes a substantially square fixed part 35 fixed to the back side of the shutter 20 by welding, a pair of first arms 36, 36 extending downward in a slanted manner from both sides of the upper ends of the fixed part 35 towards the back side of the hole, a pair of second arms 37, 37 extending upwards in a slanted manner from both sides of the lower ends of the first arms 36, 36 towards the back side of the hole, a pair of third arms 38, 38 extending downward in a slanted manner from both sides of the upper ends of the second arms 37, 37 towards the back side of the hole, and a pair of fourth arms 39, 39 extending upwards in a slanted manner from both sides of the lower ends of the third arms 38, 38 towards the back side of the hole.

The shutter biasing spring 30 of plate spring form is attached to the back side of the shutter 20 so that each of the upper ends of the fourth arms 39, 39 are pushed against the top plate of the cover 10B with the shutter 20 in a closed state and so as to elastically deform in the compressing direction. Thus, when the relevant optical connector is not being used, that is, when the plug of the fiber-optic cable is not inserted into the plug inserting hole 11 of the case 10, the shutter 20 is elastically held in the upright closed position to close the inlet, that is, the plug inserting port of the plug inserting hole 11.

When inserting the plug of the fiber-optic cable to the plug inserting hole 11 of the case 10, the plug is inserted into the plug inserting hole 11 from the front surface side with the shutter 20 closed. The shutter 20 is then opened inwardly against the biasing force of the shutter biasing spring 30. When the shutter 20 is being opened, the shutter biasing spring 30 on the back surface side elastically deforms in the direction in which the fixed part 35, the pair of first arms 36, 36, the second arms 37, 37, the third arms 38, 38, and the fourth arms 39, 39 compress, that is, the direction approaching the flat plate.

The shutter 20 is eventually opened until a state parallel to the top plate of the cover 10B is achieved. In the completely opened state, the shutter 20 is accommodated in the upper surface opening 17 of the body 10A. Further, the shutter biasing spring 30 is sandwiched so as to be substantially coplanar between the shutter 20 and the top plate of the cover 10B without interfering with each other, and generally becomes a one-plate state. Each of the upper ends of the fourth arms 39, 39 are slidably contacted to the top plate of the cover 10B.

Thus, the minimum necessary space thickness T for accommodating the shutter 20 is such in which the plate thickness of the shutter biasing spring 30 is added to the necessary thickness of the shutter 20, and is greatly reduced compared to the comparative optical connector with a shutter shown in FIG. 10.

What is claimed is:

1. An optical connector with a shutter comprising:
a case including an inserting hole for inserting a plug portion of a fiber-optic cable;
an optical element arranged at a back part of the inserting hole so as to be optically coupled to the plug inserted into the inserting hole of the case;
an inward opening shutter, opposite ends of an upper end thereof hinge-supported in the vicinity of an opening of the inserting hole, the shutter pivotable 90° from a closed position closing the insertion hole for dust proofing to an open position to extend along a ceiling of the inserting hole; and
a shutter biasing spring interposed between a back surface of said shutter and ceiling of the inserting hole to urge the shutter toward the closed position,
wherein the shutter biasing spring is a plate spring cut out from a flat plate made of metal to have substantially a W-shape when viewed from the side, and when the shutter is placed in the open position, the shutter biasing spring is elastically deformable into a shape of a flat plate between said back surface of the shutter and said ceiling of the insertion hole.

2. An optical connector with a shutter comprising:
a case including an inserting hole for inserting a plug portion of a fiber-optic cable;
an optical element arranged at a back part of the inserting hole so as to be optically coupled to the plug inserted into the inserting hole of the case;
an inward opening shutter hinge-supported in the vicinity of an opening of the inserting hole and opening inward in accordance with the insertion of the plug into the inserting hole; and
a shutter biasing spring arranged between a back surface of the shutter and an inner wall surface of the case so as to elastically support the shutter in a closed state and, when the shutter opens and lies along the inner wall surface of the case, one part or the entire part of the shutter biasing spring is sandwiched between the shutter and the inner wall surface of the case so as to be substantially coplanar,
wherein said case includes a key groove for recognizing the type of a plug, the groove arranged in the vicinity of the opening of the inserting hole, and ribs defining the key groove also serve as a stopper for holding the shutter in the closed state.

3. An optical connector with a shutter comprising:
a case including the inserting hole for inserting a plug portion of a fiber-optic cable;
an optical element arranged at a back part of the inserting hole so as to be optically coupled to the plug inserted into the inserting hole of the case;
an inward opening shutter hinge-supported in the vicinity of an opening of the inserting hole and opening inward in accordance with the insertion of the plug into the inserting hole; and
a shutter-biasing spring arranged between a back surface of the shutter and an inner wall surface of the case so as to elastically support the shutter in a closed state and, when the shutter opens and lies along the inner wall surface of the case, one part or the entire part of the shutter biasing spring is sandwiched between the shutter and the inner wall surface of the case so as to be substantially coplanar,
wherein the case comprises a body with a wall to which said shutter opens, the wall having an opening, and a cover attached to the body so as to block the opening.

* * * * *